Oct. 4, 1949.    B. R. F. KJELLGREN    2,483,647
METHOD OF GROWING A ROCHELLE SALT CRYSTAL
Filed Oct. 31, 1947

INVENTOR.
BENGT R. F. KJELLGREN
BY
*Ebers J. Hyde*
ATTORNEY

Patented Oct. 4, 1949

2,483,647

UNITED STATES PATENT OFFICE 2,483,647

METHOD OF GROWING A ROCHELLE SALT CRYSTAL

Bengt R. F. Kjellgren, University Heights, Ohio, assignor to The Brush Development Company, Cleveland, Ohio, a corporation of Ohio Application October 31, 1947, Serial No. 783,333

8 Claims. (Cl. 171—327)

This invention pertains to a method of rapidly growing large clear Rochelle salt crystals.

A prior-art method of growing Rochelle salt crystals is described in Patents Re. 19,697 and Re. 19,698 issued to Bengt Kjellgren on September 10, 1935. Briefly, it consists in preparing a slightly alkaline aqueous solution of Rochelle salt slightly supersaturated at a temperature of about 37 degrees centigrade. This solution is heated to a temperature of about 50° C. and is then poured into a hard rubber tray which has previously been preheated to about the planting temperature. In the bottom of the tray there are a number of slots, each of which contains a long slender Rochelle salt seed. A rubber cover is tightly clamped over the top of the tray to reduce evaporation of the solvent from the solution, and the solution is stirred by rocking while the temperature is slowly dropped over a period of time. This forces the salt out of the solution and it deposits on the seeds, causing them, over a period of time, to grow to large clear crystals.

In accordance with the present invention, the method of producing a clear solid crystal of Rochelle salt comprises planting a seed piece of crystalline Rochelle salt in a concentrated aqueous solution of Rochelle salt at a given temperature, effecting relative motion between the seed piece and the solution, and causing the solution to crystallize by lowering the temperature of the solution at a rate such that the average deposit of Rochelle salt, expressed in grams per 24 hours per square inch of average crystal area exposed, is between 1.6 and 2 for a temperature drop of about 15 degrees centigrade.

An object of the invention is to provide an improved method of growing Rochelle salt crystals.

Another object of the present invention is to provide a method of producing large clear Rochelle salt crystals in a shorter length of time than has been possible in the past.

A further object of my invention is to provide a method of growing a number of Rochelle salt crystals which are substantially uniform in size.

Still another object of the invention is to provide a method for growing Rochelle salt crystals of improved quality.

For a better understanding of the present invention, together with other and further objects thereof, reference is had to the following description taken in connection with the accompanying drawings, and its scope will be pointed out in the appended claims.

Figure 1:
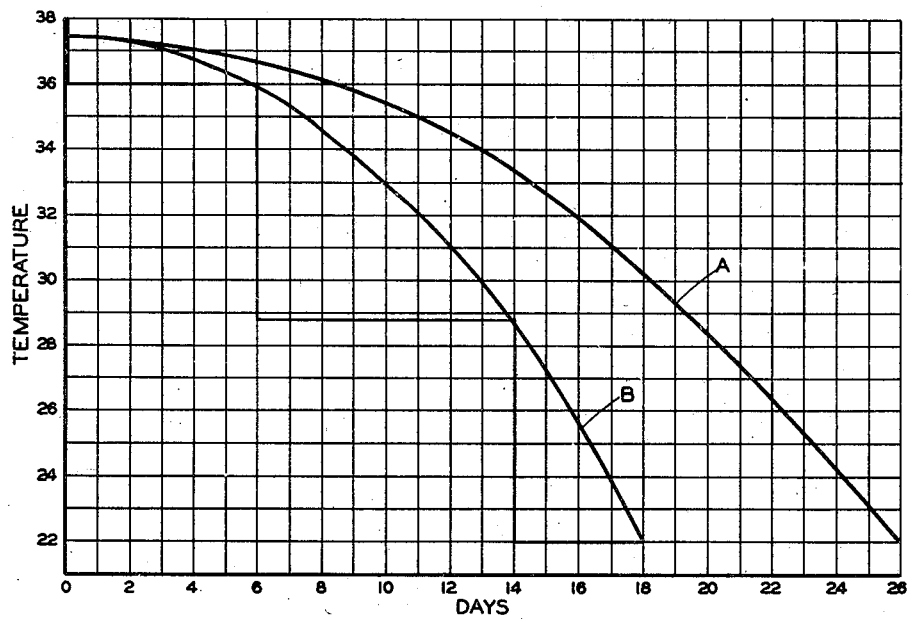
Figure 2:
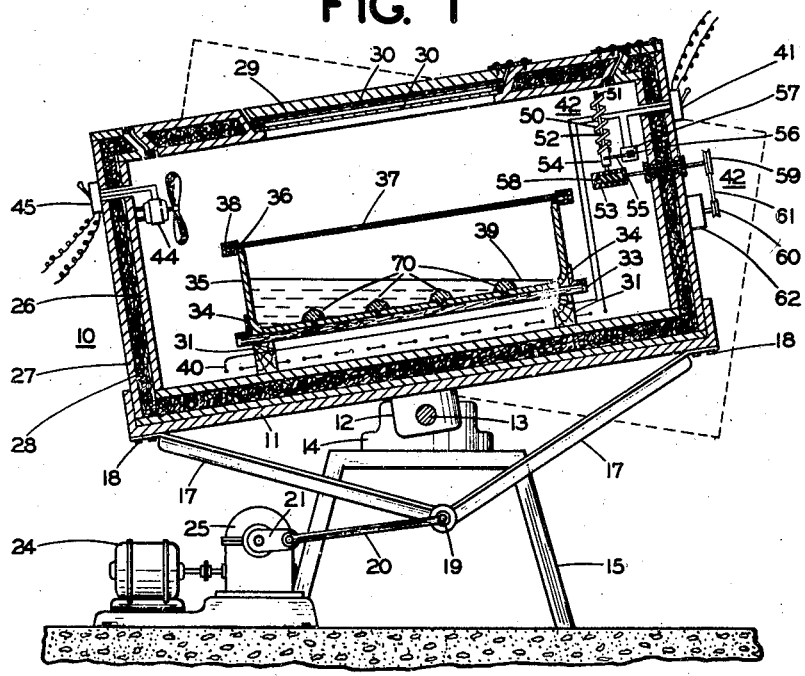

Fig. 1 is a graph comparing a prior-art growing time cycle with the growing time cycle of the present invention, and Fig. 2 is a sectional view taken through equipment for growing Rochelle salt crystals in accordance with the method of this invention.

Fig. 1 of the drawing illustrates two temperature curves. Curve A is representative of a prior-art practice wherein the temperature of a Rochelle salt solution was dropped from about 37½° C. to about 22° C. over a period of twenty-six (26) days. Four long slender Rochelle salt seed bars were present in the tray which was about 24 inches wide and 30 inches long and which contained about 24 liters of solution. Approximately 19 pounds of Rochelle salt were deposited on the four seeds during the growth period. During the growth of the crystals the tray was rocked from side to side through a given angle and with a frequency such that "breakdown" or spontaneous crystallization did not result.

Curve B illustrates the temperature drop of the present method whereby the temperature of the Rochelle salt solution is dropped from a temperature of about 37½° C. to about 22° C. in only 18 days. The tray was rocked considerably more than in the prior art practice but otherwise conditions such as volume of solution per seed, tray construction, etc., were substantially identical to the prior art practice.

In Fig. 2 there is shown equipment for practicing the present method of growing large clear Rochelle salt crystals. The equipment comprises an enclosed box indicated generally by the reference character 10, mounted on a platform 11 which is connected to a plurality of bearings 12 (only one shown) for rocking motion about a shaft 13. The shaft is supported on and spaced slightly above the base 15 by means of a plurality of end plates 14 (only one shown). One end of each of a pair of arms 17 is connected to the base 11 near the outside edge thereof by bolts 18, and the other end of each of the arms is connected to an actuating arm 20 at point 19 substantially directly underneath the shaft 13 when the rocking box 10 is in a horizontal position and the other end of the actuating arm 20 is connected to one end of a crank arm 21. Crank arm 21 is rotated slowly by power from motor 24 acting through a speed reducer 25. The box 10 may comprise two layers 26, 27 of wood or metal between which is a layer of insulating material 28 to reduce heat loss through the walls, bottom and top thereof, and a double glass observation window 30 sealed into the top of the box 10. A door 29 is provided for closing the window opening to reduce heat loss therethrough.

Connected to the bottom of the box 10 are a number of stringers 31, and a plurality of supports 33 are connected to and extend across the stringers 31. The supports are thus spaced away from the bottom of the box 10 in order that circulating air may contact the bottom of a crystallization tray 35 which is mounted on the supports 33. Angular clips 34 may be connected to the supports 33 near their ends to prevent the tray 35 from sliding as the box 10 rocks. The tray 35 preferably is formed of hard rubber and has a horizontally extending lip portion 36. A soft rubber top 37 extends across the top of the tray resting on the lip 36, and clamping means 38 are provided to seal the top 37 to the tray 35 to prevent evaporation of the solution 39 during a growing cycle. An electric heater 40 is mounted within the box 10 substantially directly underneath the tray 35. The supply of electric current to the heater 40 is controlled by an on-and-off switch 41 mounted on the outside surface of the box 10 and by a thermostatic switch means indicated generally by the reference character 42 and mounted partially inside and partially outside the box 10. An electric fan 44 is mounted on the inside of the box and current to the fan is controlled by an on-and-off switch 45 mounted on the outside of the box. When the fan is on, it circulates the warm air around the tray 35 thereby controlling the temperature of the solution within the tray.

The thermostatic switch means 42 controls the supply of electric current to the heater 40 in a manner to cause, over a period of days, a gradual decrease of the temperature within the box. Electric current to the heater 40 is supplied from an outside source through the on-and-off switch 41, and when the switch 41 is in the on-position the thermostatic switch means 42 governs the percentage of time during which the heater 40 is energized. Such a thermostatic switch is well known, so only a brief description is here given. The heat sensitive portion of the switch may comprise a helically wound bimetal member 50 one end of which is connected at 51 to a rotatable rod 52 extending longitudinally back through the bimetal 50 to a spur gear 53. The other end of the bimetal member 50 is connected to a rotatable tube 54 which surrounds the rod 52, and a contact arm 55 carrying a contact 56 is connected at right angles to the tube 54. A contact point 57 is spaced from the contact point 56 in the arcuate path of the point 56 as tube 54 rotates, and the contact points 56, 57 are connected to the heater current supply circuit in such a manner that when the points engage each other current flows to the heater 40. The spur gear 53 is meshed with a worm gear 58 which is driven slowly through pulleys 59, 60 and their interconnecting belt 61 by a clock mechanism 62. As the clock 62 drives the gear chain 58, 53 the end 51 of the bimetal 50 is rotated slightly thereby altering the temperature at which the bimetal member under the influence of a temperature which causes the contact 56 to engage the contact 57 to close the heater circuit.

When Rochelle salt crystals are to be grown in this apparatus, approximately 24 liters of aqueous Rochelle salt solution are prepared for each growing tray having the dimensions 20″ wide x 30″ long x 6″ deep. The solution preferably is made slightly alkaline with sodium or potassium hydroxide corresponding to a normality of about .1 to .15 and contains enough Rochelle salt to be saturated at a temperature of about 37½° C. This solution is heated to a temperature of about 50 degrees centigrade and poured into the hard rubber tray 35 after which four preheated Rochelle salt seeds 70 are planted in the slots in the bottom of the tray 35. The seeds are about 17 inches long, .312 inch wide and .212 inch thick, and when they are in the slots in the bottom of the tray the walls and bottom of the slot prevent sideways and downwards growth of the seed material. Prior to pouring the solution into the tray, the tray and the seeds are preheated to a uniform temperature of about 40 degrees centigrade to prevent breakage of the seeds due to thermal shock and to prevent spurious centers from being formed from contact of the hot solution with the cold tray. After pouring the solution and planting the seeds the rubber cover 37 is tightly connected to the tray 35, and the temperature of the solution is caused to drop quickly to about 38 degrees centigrade. At this temperature the motor 24 is started causing the tray to rock from side to side. The automatic temperature-control system 42 is started causing the temperature of the solution 39 inside the tray 35 to drop in accordance with curve B of Fig. 1. In order to take advantage of the rapid temperature drop without causing breakdown of the solution 39, the tray 35 must be rocked at a rate which is rapid compared to the prior art rate of rocking. It has been found that, when the tray 35 is rocked through an angle from about 9 to about 18 degrees with a frequency of about 4 cycles per minute or greater, the solution does not break down and form spurious crystals, but deposits crystalline material substantially evenly on the four crystal seeds. The upper limit of the rate of cyclic motion is dependent to a large degree upon the condition of the equipment and accordingly it is somewhat difficult to set, but if the bearings which support the box 10 and the drive mechanism are substantially vibrationless in their operation, it is possible to rock the tray at a rate of 7 or 8 cycles per minute or perhaps even faster. If the equipment causes vibration, a high rate of rocking will ripple the solution and cause a "breakdown." For the average growing equipment which has been in operation for some time, it has been found that a rocking frequency of from about 4 to about 6 cycles per minute will quickly yield crystal bars of excellent quality, i. e., free from inclusions of mother liquor, and an optimum rate is 5 cycles per minute. It has been found with the foregoing rocking rate that it is preferable to rock the tray through an angle of from about 9 to about 18 degree with an optimum at about 13 degrees. The minimum amount of rocking necessary to grow large clear crystals in about 18 days has been found to be about 9 degrees with a frequency of 4 cycles per minute. This is equivalent to moving a volume of solution equal to the volume of the solution in the tray past the centerline of the tray once every minute throughout the growing period.

The maximum rate of temperature drop, with a given amount of rocking of the supersaturated solution in the tray, is dependent upon the exposed area of the crystalline material in the tray. Thus, at the start of a crystallization run when the top surface of the four seeds is the only exposed area, the temperature is dropped rather slowly, averaging about .25 degree centigrade per day for a period of about six days and starting with temperature drop of .10–.20° C. per 24 hours. During this time the flat seed top becomes peaked from the developing natural crystal surfaces so that more crystal area is exposed to the solution. The rate of the temperature drop is then increased to an average drop of about .9 degree centigrade per day for about the next eight days. Due to the crystal growth during this period the rate of temperature drop can be increased to about 1.70 degrees centigrade for each following successive day. Thus the average temperature drop per day over a period of about 18 days is about .86 degree centigrade.

The temperature of the concentrated solution should not be higher than about 40 degrees centigrade as sodium tartrate will crystallize out of the solution, and it has been found somewhat impractical in the apparatus described to lower the temperature of the solution much below about 20 degrees centigrade as cooling becomes a problem. However, the solution in the tray still contains a considerable quantity of Rochelle salt and the crystallization run can be continued with consequent additional growth of the crystal bars by the use of refrigeration. The lowest limit would be the freezing point of the solution.

It is evident that the above-noted temperature drops per 24 hours relate to the number and the size of the seeds planted in the trays and the volume of the solution in each tray. It has previously been stated that each tray contains four seeds 17 inches long and .312 inch wide and that each tray contains approximately 24 liters of Rochelle salt solution saturated at 37½ degrees centigrade. For every degree this solution is cooled, a certain amount of salt will be deposited in accordance with the solubility curve of Rochelle salt. This salt will be deposited on all four seeds. It is also evident that as the salt is deposited on these seeds the crystal area contacting the solution will be correspondingly increased. As this area is increasing, it will at first seem logical that the amount of salt that can be precipitated on each crystal would increase in proportion to the increase in the area. However, it has been found that this is not the case and that actually the rate of deposit per square inch area per 24 hours decreases as the crystal area is increased. Initial deposition rates as high as about 7 grams of Rochelle salt per square inch of seed area per 24 hours, and depositions as low as about 1 gram per square inch per 24 hours at the end of the growing run have been measured. The reason for this is probably that, in making clear crystals without any inclusions of mother liquor, it is necessary to feed the exposed area efficiently and equally at all points. As the area grows, this becomes increasingly difficult even with increased stirring of the solution. It has been found that, when a seed such as described above has grown to a finished crystal having an exposed area of approximately 116 square inches, the average rate of growth, expressed in grams of Rochelle salt deposited per 24 hours on the average crystal area during the growth, equals about 1.85. If this crystal were taken out of the solution at a point where the area was only 100 square inches, the average rate is found to be somewhat higher, being equal to about two grams per square inch. In the very beginning of crystal growth, this rate is considerably higher but this is relatively unimportant as such small crystals cannot be used practically. The average weight of the crystal which is produced by temperature drops of about 15 degrees is about two kilograms, and the average rate of growth in grams per 24 hours on the average crystal area during the growth of the crystal may equal a value as high as 2.

Prior to the present invention crystal bars weighing approximately two kilograms were grown in about 26 days, corresponding to an average rate of growth of about 1.33 grams per square inch on the average exposed crystal area for a temperature drop of about 15 degrees centigrade; i. e., from about 37 to about 22 degrees centigrade. Although this particular temperature range can be changed up or down, it has been found that the range from about 37 to 22 degrees centigrade is most practical in the manufacturing process.

By so correlating the increased rocking of the solution with a rapid drop in temperature the production per crystal growing plant has been greatly increased. The savings in crystal growing time alone provides an increase in crystal bars per plant of about 33%. Further savings are realized by an increase in the quality of the crystal bars as it has been found that actually fewer flaws are present in the bars grown by the present rapid temperature-drop method than by the previous slower temperature-drop method. This improvement is especially noticeable in the end flaws. It has been found in the past that the crystalline material which grows at the ends of the long seeds is much more apt to be flawed than the rest of the crystalline material in the bar. This end material constitutes about one-seventh of the length of the bar and in the past only a very small percentage of grown bars had usable end material. With the new growing method, it has been discovered that the end material is far superior and much of it is used to fabricate piezoelectric elements. This increases the yield over the previous yield by about 10 percent, making an overall measurable increase in production of about 43 percent. A further increase, which is not readily measured, is realized because the four crystal bars in each tray tend to be more uniform in size. This aids in the efficient cutting and fabricating of piezoelectric crystal elements from the bars as it is much easier to handle crystal bars which are uniform in size and shape. It is believed that this uniformity of crystal size is due to a much more uniform washing of the four crystal seeds by the solution than was achieved by the previous method which utilized a much slower rocking period.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim as my invention:

1. The method of producing a clear solid crystal of Rochelle salt which comprises planting a seed piece of crystalline Rochelle salt in a concentrated aqueous solution of Rochelle salt at a given temperature below about 40 degrees centigrade, effecting relative motion between the said seed piece and the said solution, and causing the solution to crystallize by lowering the temperature of the solution at a rate such that the average deposit of Rochelle salt expressed in grams per 24 hours per square inch of average exposed crystal area is between about 1.6 and 2 for a total temperature drop of about 15 degrees centigrade.

2. The method of producing a clear solid crystal of Rochelle salt which comprises planting a seed piece of crystalline Rochelle salt in a concentrated aqueous solution of Rochelle salt at a given temperature below about 40 degrees centigrade, causing the solution to crystallize by lowering the temperature of the solution at a rate such that the average deposit of Rochelle salt expressed in grams per 24 hours per square inch of average exposed crystal area is between about 1.6 and 2 for a total temperature drop of about 15 degrees centigrade, and effecting relative motion between said seed piece and the said solution, said rate of relative motion being sufficiently high that the said deposit is in the form of clear crystalline material, and said rate of relative motion being sufficiently low that said solution is prevented from breaking down.

3. The method of growing a clear solid crystal of Rochelle salt which comprises: planting a seed piece of crystalline Rochelle salt in a given amount of concentrated aqueous solution of Rochelle salt at a given temperature below about 40 degrees centigrade, causing the solution to crystallize by lowering the temperature of the solution at a rate such that the average deposit of Rochelle salt expressed in grams per 24 hours per square inch of average exposed crystal area is between about 1.6 and 2.0 for a total temperature drop of about 15 degrees centigrade, and effecting relative motion between said seed piece and the said solution to cause said given amount of solution to move past said seed piece in about one minute intervals throughout the growing period of said crystal.

4. The method of producing a clear solid crystal of Rochelle salt which comprises planting four seed pieces of crystalline Rochelle salt each about 17 inches long and about 3 inches wide in a tray 24 inches wide, 30 inches long and containing 24 liters of a concentrated aqueous solution of Rochelle salt at a given temperature, effecting relative motion between the said seed piece and the said solution by rocking said tray through an angle of from about 9 to about 18 degrees with a frequency of at least about four cycles per minute, and causing the solution to crystallize by lowering the temperature of the solution at a rate such that the average deposit of Rochelle salt expressed in grams per 24 hours per square inch of average exposed crystal area is between about 1.6 and 2 for a total temperature drop of about 15 degrees centigrade.

5. The method of producing a clear solid crystal of Rochelle salt as set forth in claim 4 in which said rocking angle is about 13 degrees and in which said frequency is about five cycles per minute.

6. The method of producing clear solid crystals of Rochelle salt which comprises: planting four seed pieces of crystalline Rochelle salt each about 17 inches long and about 3 inches wide in a tray about 24 inches wide, 30 inches long and containing 24 liters of a concentrated aqueous solution of Rochelle salt at a given temperature below about 40 degrees centigrade; effecting relative motion between the said seed pieces and the said solution by rocking said tray to such an extent and with such a frequency that 24 liters of solution move past the center-line of said tray at about one minute intervals throughout the growing period of said crystals, and causing the solution to crystallize by lowering the temperature of the solution at a rate such that the average deposit of Rochelle salt expressed in grams per 24 hours per square inch of average exposed crystal area is between about 1.6 and 2.0 for a total temperature drop of about 15 degrees centigrade.

7. The method of producing a clear solid crystal of Rochelle salt which comprises planting seed means of crystalline Rochelle salt in a tray containing about six liters of concentrated aqueous solution of Rochelle salt per seed and at a given temperature, effecting relative motion between each seed and the said solution by rocking said tray through an angle of from about 9 to about 18 degrees with a frequency of from about 4 to about 6 cycles per minute, and causing the solution to crystallize by lowering the temperature of the solution at a rate such that the average deposit of Rochelle salt expressed in grams per 24 hours per square inch of average exposed crystal area is between about 1.6 and 2 for a total temperature drop of about 15 degrees centigrade.

8. The method of producing a clear solid crystal of Rochelle salt as set forth in claim 7 in which said tray is about 30 inches long and about 20 inches wide, and in which there are four seed strips each about 19 inches long and about .3 inch wide, said seeds being planted in said tray with their length dimension extending in the direction of the length of said tray, and said tray is rocked to cause the solution to flow in a direction substantially perpendicular to the direction of extension of said seeds.

BENGT R. F. KJELLGREN.

REFERENCES CITED

The following references are of record in the file of this patent:

UNITED STATES PATENTS

| Number | Name | Date |
|---|---|---|
| Re. 19,697 | Kjellgren | Sept. 10, 1935 |
| Re. 19,698 | Kjellgren | Sept. 10, 1935 |
| 1,353,571 | Dreibrodt | Sept. 21, 1920 |